D. F. ZIMMERS, E. N. JESSOP, W. J. KOENIG AND J. B. GARNER.
PROCESS OF MANUFACTURING CARBON BLACK.
APPLICATION FILED APR. 13, 1918.
1,307,430.
Patented June 24, 1919.
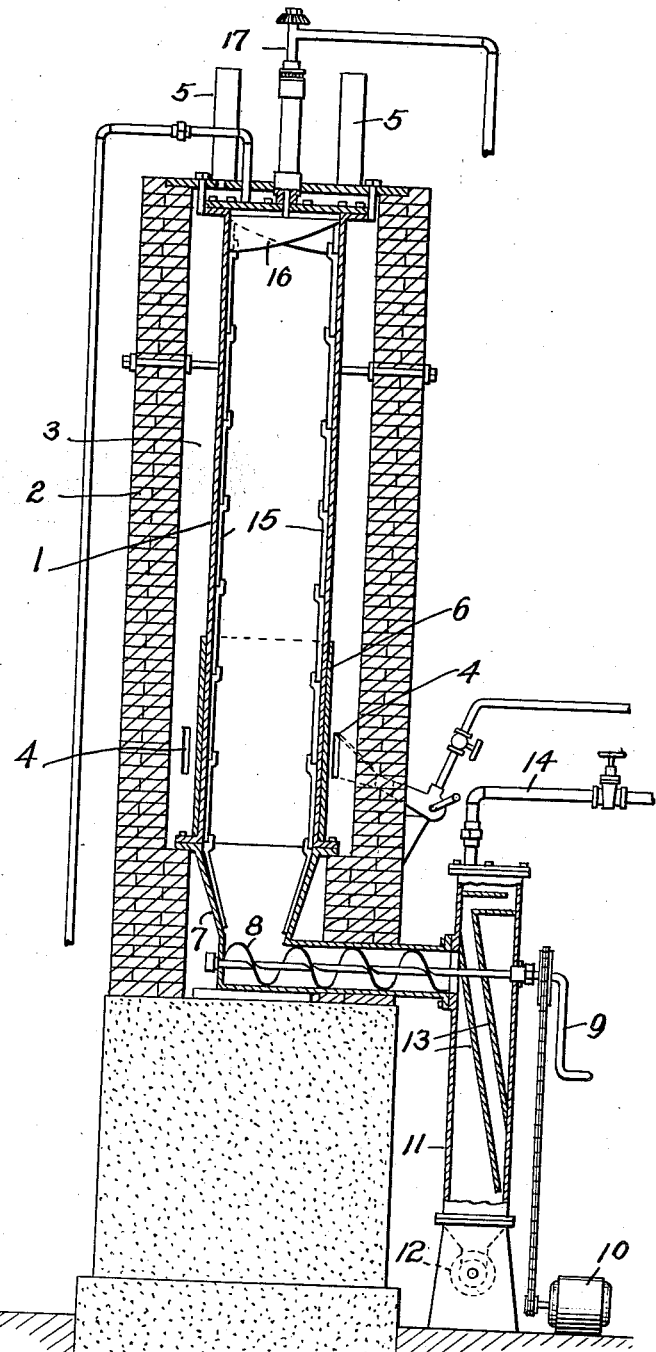

UNITED STATES PATENT OFFICE.

DAVID F. ZIMMERS, OF ALTOONA, EARLE N. JESSOP, OF GLASSPORT, WALTER J. KOENIG, OF SPRINGDALE, AND JAMES B. GARNER, OF PITTSBURGH, PENNSYLVANIA, ASSIGNORS TO HOPE NATURAL GAS COMPANY, OF PITTSBURGH, PENNSYLVANIA, A CORPORATION OF WEST VIRGINIA.

PROCESS OF MANUFACTURING CARBON-BLACK.

1,307,430.  Specification of Letters Patent.  Patented June 24, 1919.

Application filed April 3, 1918. Serial No. 226,428.

*To all whom it may concern:*

Be it known that we, DAVID F. ZIMMERS, of Altoona, Blair county, EARLE N. JESSOP, of Glassport, Allegheny county, WALTER J. KOENIG, of Springdale, Allegheny county, and JAMES B. GARNER, of Pittsburgh, Allegheny county, in the State of Pennsylvania, citizens of the United States, have invented or discovered certain new and useful Improvements in Processes of Manufacturing Carbon-Black, of which improvements the following is a specification.

The object of our invention is to provide a method for producing carbon black from natural gas.

It has been heretofore proposed to manufacture or produce carbon black by the thermal decomposition of natural gas into its constituent elements, namely, hydrogen and carbon. However, to the best of our knowledge, in every such instance the entire body of the gas has been subjected to heat. Our invention is predicated primarily upon our discovery that far greater yields of carbon black may be obtained by first separating the natural gas into its constituent elements and then subjecting the separated bodies of gas to a decomposing temperature.

Natural gas, as contemplated herein, consists of a mixture of various relative proportions of the hydrocarbons methane, ethane, propane, butane, pentane, haxane, heptane, and actane. It is of natural origin and of underground source.

The manner of separating the gas into its constituent elements forms no part of our invention. In the practice of our invention the separation of the gas has been effected by a selective absorption process consisting, briefly stated, of subjecting the gas to absorbing menstruums capable of absorbing some of the gaseous constituents and permitting others to pass unabsorbed. This process is fully described in the application for United States Patent, Serial No. 113,300, by James B. Garner and Howell C. Cooper. According to this separating process as it is now actually practised, natural gas, while under pressure, is first passed through a menstruum consisting of a body of liquid petroleum hydrocarbons which absorbs propane and heavier constituents of the gas and permits methane and ethane to pass through it. Some ethane, also, is retained in or absorbed by the menstruum. The pressure is then removed from the menstruum with the result that the entrained ethane and some of the absorbed or entrained propane and butane are released and pass off as gases, known in the industry as vent gases. Thereafter, the menstruum is subjected to a distilling operation for the removal of the remaining absorbed constituents of the gas, such constituents consisting chiefly of propane and the heavier hydrocarbons. The vapors resulting from such distillation are then subjected to a condensing operation in which substantially all the pentane and heavier hydrocarbons are liquefied, the same being sold as gasolene. The uncondensed gases are then passed through a body of liquid petroleum hydrocarbons capable of absorbing such pentane and heavier hydrocarbons as may be mixed with the gases, and the unabsorbed gases, a substantially pure mixture of propane and butane are separated by fractional condensation.

When, in the practice of our invention, natural gas is separated by the process thus briefly explained, the gases subjected to a decomposing temperature may be either (1) the gases unabsorbed in first absorption step; (2) the so-called vent gases resulting from the removal of pressure from the menstruum after the first absorption step; (3) the entire body of gases, which, under the prevailing temperature and pressure conditions, remain uncondensed in the condenser subsequent to the distillation step; (4) the mixture of propane and butane gases resulting from the second absorption step; or (5) the separated propane and butane gases resulting from the fractional condensation step. It will be observed that when the last mentioned gases are treated, the gas will consist of but a single constituent of the natural gas, while in the treatment of each of the other bodies of gases each body will consist almost wholly of a mixture of two hydrocarbons which are adjacent members of the paraffin series. While the largest yields of carbon black, per unit volume of gas treated, may be obtained when the gas treated consists of but a single constituent of natural gas, we have discovered that approximately twice as much carbon black may be obtained from natural gas when separated into bodies consisting largely of but two constituents of the gas as when the entire body of natural gas is treated.

In treating the thus, or otherwise, divided or separated natural gas, we have found that while large yields of carbon black may be obtained by subjecting the gas to a temperature of from 700° to 950° C., the greatest yields are obtained when working at a temperature of from about 750° to 850° C. It is, however, desirable that the gas being treated be thoroughly subjected to the decomposing temperatures.

When treating the divided gas in the manner just stated, a flocculent uncoked jet-black carbon is obtained, a carbon black particularly well suited for pigments and other use requiring a high grade product. In addition to the carbon black, there is produced by our process a considerable quantity of unsaturated hydro-carbons consisting largely of ethylene.

It is furthermore characteristic of our process that the volume of the resulting by-product gas is from one and one half to three times the volume of the gas treated depending upon the constituents of the hydrocarbon gases treated. This by-product gas has, per unit volume, less heating value than the entering gas, but it is nevertheless well suited for heating purposes.

In subjecting the entire body of natural gas to a decomposing temperature, the maximum yields of carbon black obtainable are from three to four pounds per thousand cubic feet of the gas treated. By separating natural gas into its constituents as contemplated by our invention and as described herein, we have found by extensive experiments and by actual commercial practice that the yield of carbon black is from two to seven times as much as when the entire body of gas is treated.

The divided or separated constituents of natural gas may be thoroughly decomposed by means of various types of apparatus. In the accompanying drawing we have shown, in a combined vertical section and elevation, apparatus which is particularly well suited for the purpose. This apparatus, however, forms no part of our invention.

The apparatus shown herein contemplates the use of gas as fuel for generating the required temperature. A vertically disposed retort 1 constructed of any suitable material is surrounded by a furnace wall 2, which, with the retort, forms an annular combustion chamber 3. Near its bottom the wall 2 is provided with a plurality of burner inlets 4 for the introduction of a combustible mixture of gas and air, while the products of combustion escape at the top of the furnace through suitable pipes 5. To protect the retort against becoming too highly heated, the lower portion is surrounded by a shield 6.

To the lower end of the retort there is attached a hopper 7 leading to a screw-conveyer 8 for the removal of the carbon black formed in the retort, such conveyer being operated either by a crank arm 9 or by a motor 10. The carbon black thus removed from the retort drops to the bottom of a baffle box 11 from which it is finally removed by a second screw conveyer 12. Baffle plates 13 within the box 11 are arranged to collect on their faces the heavy tarry substance resulting from the retort treatment and carried by the by-product gas leaving the retort. This by-product gas finally escapes from the box 11 through a pipe 14.

During the thermal decomposition of the gas, the inner wall of the retort is scraped and the gas being treated is agitated by means of a plurality of bars 15 suitably linked together and suspended from a rotatable head 16 which may be driven in any suitable manner by means of a shaft 17 connected to it.

We claim as our invention:

1. The process of manufacturing carbon black from natural gas, which consists in separating from such gas a gaseous mixture consisting chiefly of not more than two of the constituents of natural gas, and subjecting such mixture to a decomposing temperature.

2. The process of manufacturing carbon black from natural gas, which consists in separating from such gas a gaseous mixture consisting chiefly of not more than two of the constituents of natural gas, and subjecting such mixture to a decomposing temperature of from about 700° to 950° C.

3. The process of manufacturing carbon black from natural gas, which consists in separating from such gas one of its constituents lighter than pentane, and subjecting such constituent to a decomposing temperature of from about 700° to 950° C.

4. The process of manufacturing carbon black from natural gas, which consists in separating from such gas one of its constituents lighter than pentane, subjecting such constituent to a decomposing temperature of from about 700° to 950° C., and agitating the gas while subjecting it to such temperature.

In testimony whereof we have hereunto set our hands.

DAVID F. ZIMMERS.
EARLE N. JESSOP.
WALTER J. KOENIG.
JAMES B. GARNER.

Witness:
FRANCIS J. TOMASSON.